July 19, 1949.  R. OLINGER  2,476,761
HAIRSPRING TESTING AND ADJUSTMENT MECHANISM
Filed June 18, 1945  4 Sheets-Sheet 1
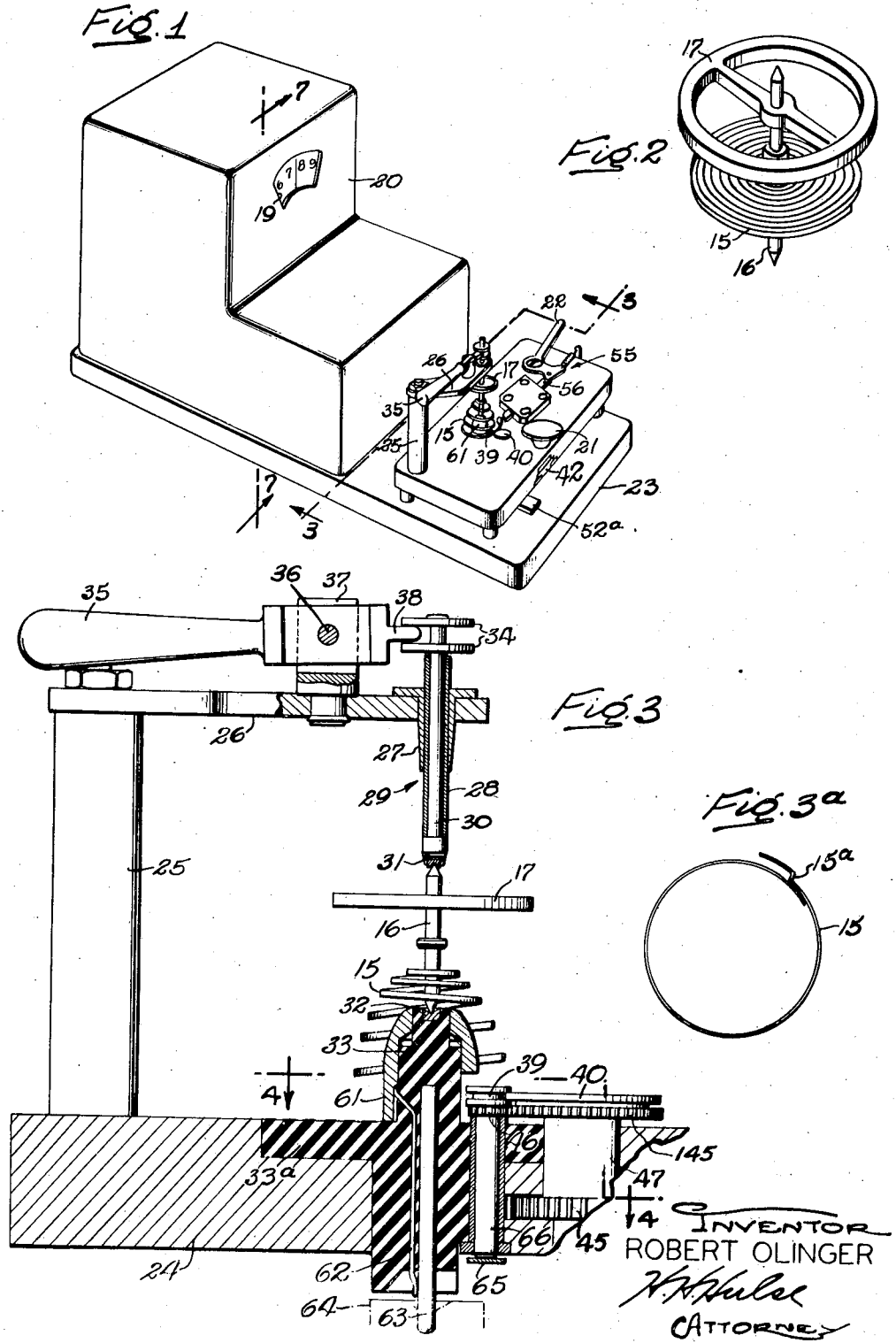

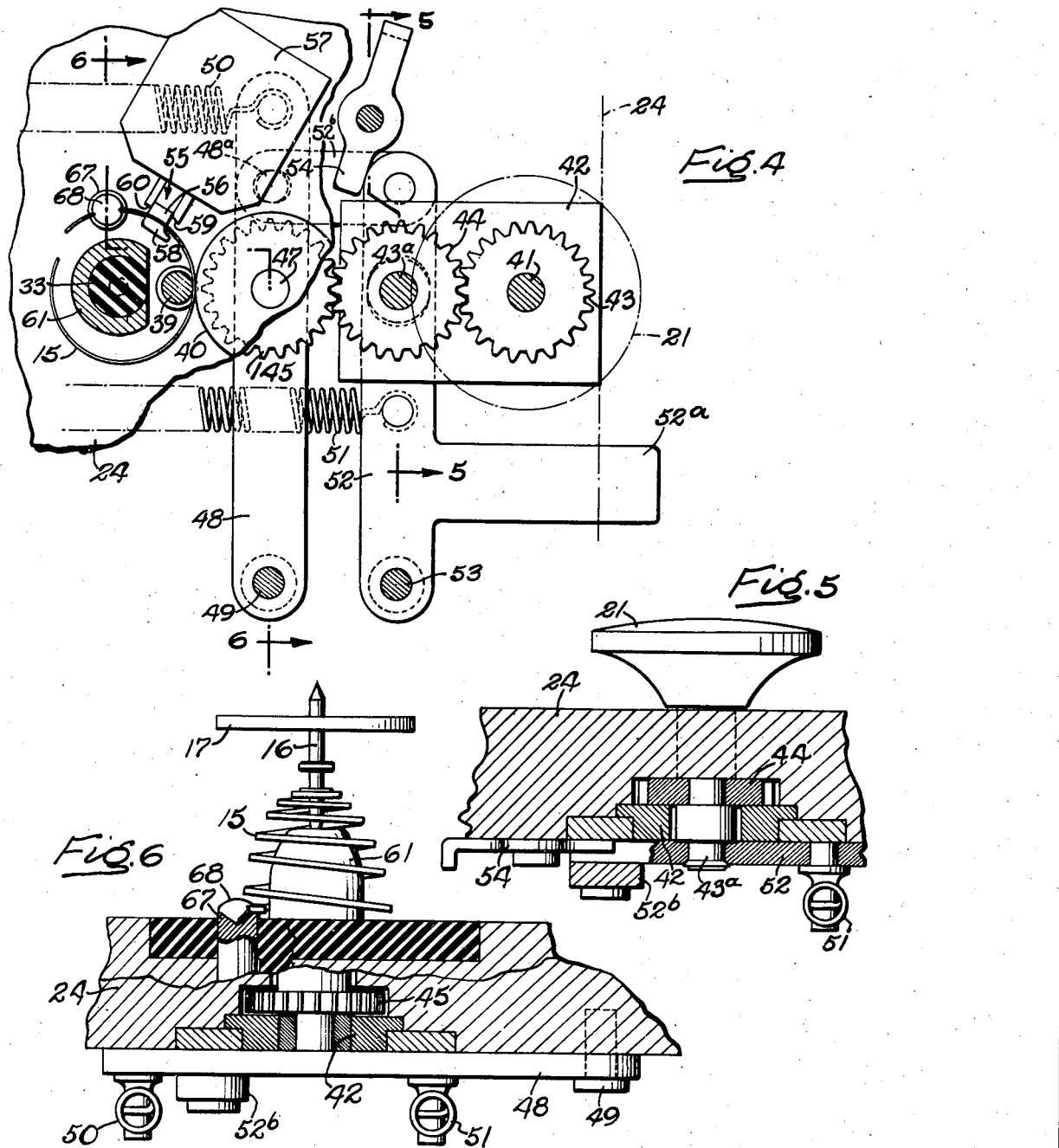

July 19, 1949.   R. OLINGER   2,476,761
HAIRSPRING TESTING AND ADJUSTMENT MECHANISM
Filed June 18, 1945   4 Sheets-Sheet 3
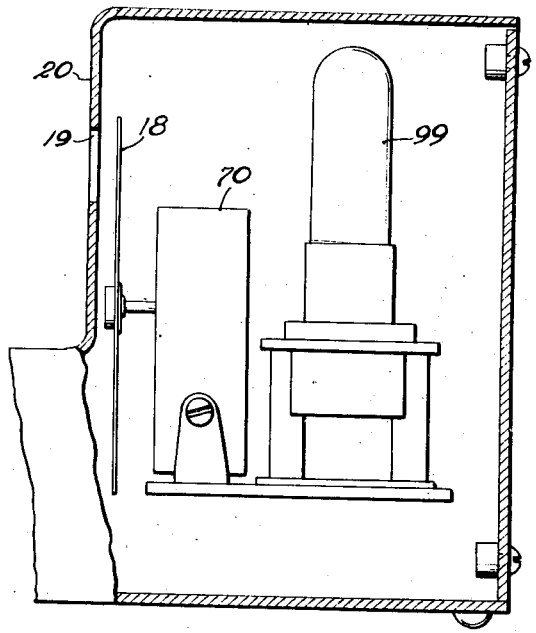
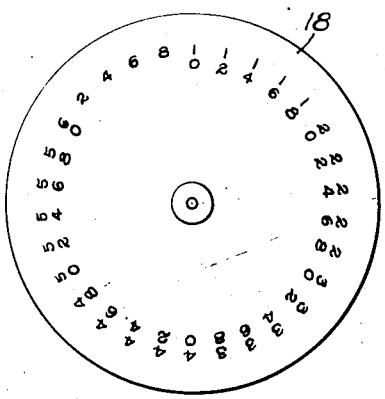
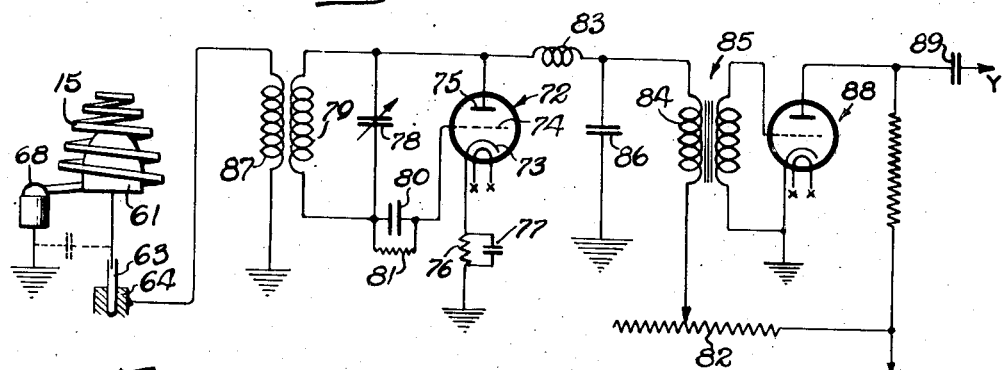
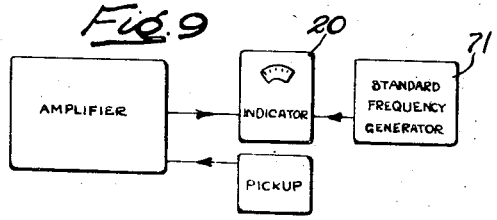
INVENTOR
ROBERT OLINGER
ATTORNEY

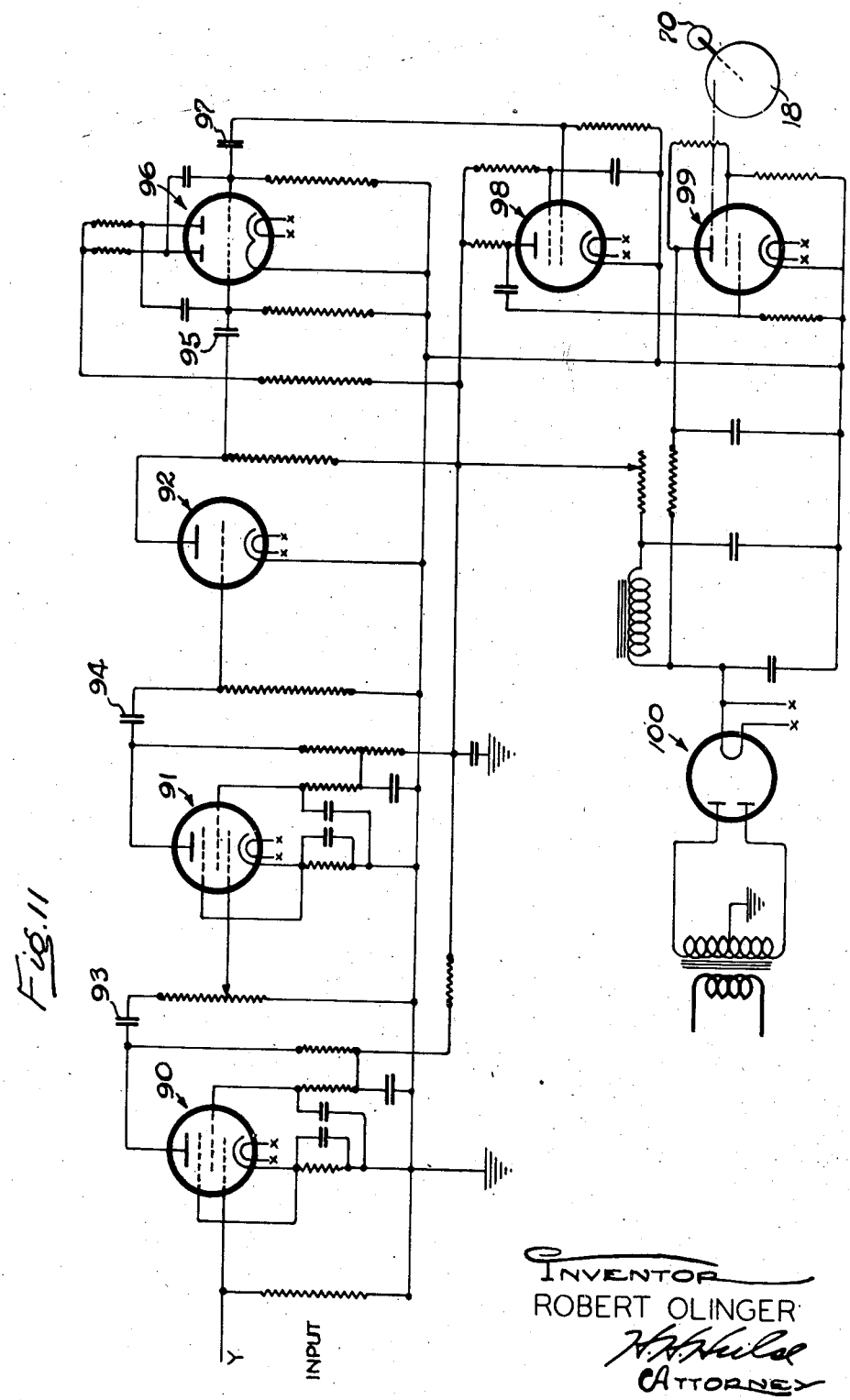

Patented July 19, 1949

2,476,761

UNITED STATES PATENT OFFICE 2,476,761

HAIRSPRING TESTING AND ADJUSTMENT MECHANISM

Robert Olinger, La Salle, Ill., assignor to General Time Corporation, New York, N. Y., a corporation of Delaware Application June 18, 1945, Serial No. 600,097

12 Claims. (Cl. 73—6)

The present invention pertains to the testing and adjustment of hairspring and balance wheel assemblies such as are used in clocks or other timepieces.

The general aim of the invention is to simplify the problem of adjusting hairsprings to maintain preselected rates of vibration, particularly in a manner suited for use in large-scale manufacture of timepieces.

More particularly, it is an object of the invention to provide a testing machine or mechanism upon which one after another of a series of hairspring and balance wheel assemblies may be set up, departures from a selected value indicated for the natural period or rate of oscillation or vibration of the assembly, and the hairspring quickly and easily adjusted to bring the rate to precisely the predetermined value desired.

Further objects and advantages of the invention will become apparent as the following description proceeds, taken in connection with the accompanying drawings in which:

Figure 1 is a general perspective view of a hairspring testing and adjustment mechanism embodying the present invention.

Fig. 2 is an enlarged perspective view of a hairspring and balance wheel assembly, typical of the form which the presently disclosed mechanism is adapted to test.

Fig. 3 is an enlarged fragmentary detail sectional view taken substantially along the line 3—3 in Fig. 1.

Fig. 3a is a detail plan view of the outer portion of the hairspring included in the assembly of Fig. 2 and showing the same after it has been kinked and cut to length in the machine of Fig. 1.

Fig. 4 is an enlarged detail sectional view taken substantially along the line 4—4 in Fig. 3, showing particularly the detail of the spring adjusting, kinking and cut-off devices included in the machine of Fig. 1.

Fig. 5 and 6 are detail sectional views taken, respectively, substantially along the lines 5—5 and 6—6 in Fig. 4.

Fig. 7 is an enlarged vertical sectional view taken substantially along the line 7—7 in Fig. 1, showing the interior of the upper portion of the housing of the machine in which the stroboscopic disk is housed.

Fig. 8 is a face view of the stroboscopic disk included in the mechanism shown in Fig. 7.

Fig. 9 is a schematic representation of the connections between the principal electrical components of the machine.

Fig. 10 is a schematic wiring diagram of the pick-up circuit connections and initial stage of amplification included in the machine.

Fig. 11 is a wiring diagram of the balance of the electrical circuiting included in the machine and constituting in effect a continuation of Fig. 10 when the two are placed end to end.

While the invention is susceptible of various modifications and alternative constructions, I have shown in the drawings and will herein describe in detail the preferred embodiment, but it is to be understood that I do not thereby intend to limit the invention to the specific form disclosed, but intend to cover all modifications and alternative constructions falling within the spirit and scope of the invention as expressed in the appended claims.

Referring more particularly to the exemplary embodiment of the invention herein illustrated, the same has been shown (Fig. 1) as embodied in a machine for testing and adjusting hairspring and balance wheel assemblies like that of Fig. 2. The assembly shown in the latter figure is of the familiar form commonly used in spring wound clocks and like devices. It comprises a spiral spring 15 having its inner end fixed to a balance staff 16 carrying a balance wheel 17. The hairspring 15 itself is made of metal, usually steel, and is therefore electrically conductive, a factor of which advantage is taken in the present invention as will hereinafter appear.

Hairspring and balance wheel assemblies like that of Fig. 2 are employed for regulating the speed of spring driven clock trains or the like. The assembly is dependent for its operation upon its natural period or frequency of vibration. The outer end of the spring 15 is anchored during use, and the balance wheel 17 oscillated back and forth by the coiling and uncoiling of the spring as the latter vibrates. The rate of vibration inheres in the spring and varies with its effective length. In manufacturing a timepiece to fixed specifications, it is therefore necessary to adjust the hairspring 15 with extreme precision and nicety to afford exactly the required rate of vibration. With the disclosed machine that adjustment can be made quickly and easily by a comparatively unskilled operator.

The general plan followed in the disclosed machine is to set up the hairspring and balance wheel assembly in such manner that the hairspring constitutes one electrode of a condenser. Then the spring is set to vibrating so that its changes in position relative to a cooperating stationary condenser electrode, incident to the hairspring's vibration, alter the electrical capacity of the condenser so constituted. The periodicity of occurrence of such changes in condenser capacity is, of course, the same as the rate at which the spring is vibrating. Such periodic changes in condenser capacity are then utilized in suitable electric circuits to afford a signal by which the operator can readily determine when, through adjustment of the hairspring, he has achieved a desired or predetermined natural frequency of vibration for the spring. Desirably the signaling arrangement is such that the frequency of spring vibration is stroboscopically compared with a fixed frequency of the desired predetermined value.

By way of further preliminary to detailed consideration of the illustrated testing machine, it should be noted in reference to its manipulation that provision is made for releasably fixing the assembly 15, 17 in place for unimpeded vibration. Having given the balance wheel a flip to set the spring 15 vibrating, the operator observes a stroboscopic disk 18 through an aperture 19 (Fig. 1) in a housing or casing 20. So long as the spring 15 is vibrating at a frequency other than that which has been chosen by preliminary setting of the instrument, the disk 18 will appear to revolve. By simply turning a knob 21 the length of the spring 15 (and hence its frequency of vibration) is altered, the disk 18 having the appearance of slowing down as the frequency of the spring 15 approaches the preselected value for the same. Finally, when the frequency of the spring 15 has been adjusted so that the spring is vibrating at precisely the preselected rate, the disk 18 has the appearance of being stationary. Thereupon the operator pulls a lever 22 to kink the spring 15 at the point of determined length and cut off any excess length of spring. The hairspring 15 is thus completely readied for installation in a timepiece.

Having in mind the general plan of the machine as outlined above, attention may now be given to details of the exemplary mounting, adjustment and cut-off mechanism associated with the spring 15, and thereafter to the exemplary form of electric signaling system employed.

The testing machine illustrated (see Fig. 1) includes a main base 23 to which is fixed the housing 20 and on which is removably rested a heavy metal base or block 24. Rising from the latter base 24 is a post 25 carrying an overhanging arm 26 to which is fixed a spring sleeve 27. The outer sleeve 28 of a tailstock assembly, designated generally as 29, is gripped by the spring sleeve 27. This tailstock assembly also includes a rod 30 mounted for limited endwise sliding movement within the sleeve 28 and carrying a jewel bearing 31 on its lower end. A second jewel bearing 32 is fixed in a stud 33 made of insulating material and fixed to the base 24.

The ends of the balance staff 16 are received in the jewel bearings 31, 32. It is imperative that the staff 16 be able to turn freely in its bearings during the testing operation so that there will be no stickiness of the bearings to alter the apparent natural frequency of the hairspring 15. It is to insure such freedom that the tailstock rod 30 is given a slight freedom of endwise movement in the sleeve 28. As to that, it will be observed that a spool 34 is fixed to the upper end of the rod 30, the lower face of the spool having a clearance of, for example, about 0.005 inch from the upper end of the sleeve 28 when the rod 30 is pulled up within the sleeve 28 until the bearing 31 abuts against the lower end of such sleeve. An operating handle 35 is pivoted at 36 on a bracket 37 fixed to the overarm 26 and has its nose portion 38 inserted in the groove defined by the spool 34. The operating handle thus serves to slide the rod 30 up and down in the sleeve 28.

When inserting a hairspring assembly in the machine the operator slides the whole tailstock assembly 29 upward in the sleeve 27 and puts the hairspring assembly in place. The tailstock is then pulled down to engage the bearing 31 with the upper end of the staff 16, and the handle 35 raised to force the bearing down tightly against the staff. Thereafter the handle is dropped, raising the bearing 31 by an amount equal to the clearance between the upper end of the sleeve 28 and spool 34 so that the staff 16 is free to turn without any binding in the bearings.

The outer or free end of the hairspring 15 is pulled downward and gripped between a pair of rollers 39, 40 so that the hairspring assumes the generally helical configuration of Fig. 3 as distinguished from its normal flat, spiral configuration shown in Fig. 2. The roller 39 is grooved, the coacting roller 40 being dimensioned to enter within the groove so that the hairspring is tightly clamped between them. It will thus be seen that by revolving the clamping rollers 39, 40 the length of the hairspring 15 between its respective end anchorage points at the shaft 16 and at rollers 39, 40 may be varied at will, thus altering the natural frequency of vibration of the spring through change in its length.

The clamping rollers 39, 40 are turned for adjusting the effective length of the spring by the operating knob 21 heretofore noted. The operating connections between the knob 21 and the rollers is desirably such that the stress in the spring will not inadvertently be altered by variations in gear tooth pressure, etc., in the connection. A preferred arrangement is shown in Figs. 4 and 5. As there indicated the operating knob 21 is fixed to a shaft 41 journaled in a rectangular slide 42 which is mounted in the base 24 to move endwise transaxially of the rollers 39, 40. On the shaft 41 above the slide 42 is fixed a gear 43 meshed with an intermediate or idler gear 44, the latter being journaled on a pin 43a fixed to the slide 42. The intermediate gear 44 meshes with a gear 45 rigidly secured to the lower end of a pin 47. Rigidly secured to the upper end of pin 47 is a gear 145 rigid with the roller 40 which in turn meshes with a gear 46 rigid with the cooperating clamping roller 39. Pin 47 is journaled in a lever arm 48 pivoted at 49 to swing roller 40 toward the cooperating clamping roller 39. A tension spring 50 yieldably urges the lever 48 to swing in a direction (counterclockwise as viewed in Fig. 4) to bring the rollers 39, 40 together, thereby maintaining the hairspring 15 firmly clamped between the rollers with a pressure determined by the setting of the spring 50.

To retain the intermediate gear 44 and roller gear 45 in mesh, the slide 42 carrying the gear 44, along with the gear 43, is urged toward the gear 45 by a tension spring 51. The latter spring is connected to a lever 52 pivoted at 53 and also pivotally connected to the pin 43a carried by the slide 42. An adjustable stop 54 serves, however, to limit the travel of the lever 52 sufficiently, in a direction toward the gear 45, so that the tension of the spring 51 is never imposed through the gearing onto the clamping rollers 39, 40. In this manner the gear drive for the clamping rollers is retained constantly in mesh, despite variations in bodily displacement of the rollers relative to each other incident to variations in thickness of the hairsprings 15 which they may clamp, and without alteration in the clamping pressure exerted from the spring 50.

A handle 52a on the lever 52 (Fig. 4) is positioned to project in convenient position beyond the front edge of the base 24 (see Fig. 1) and is used in opening the rollers 39, 40 for insertion or removal of a hairspring 15. For that purpose a link 52b is pivoted on the outer end of the lever 52 and has a lost motion pin and slot type connection at 48a with the lever 48. Pulling on the handle 52a to swing the lever 52 to the right (as viewed in Fig. 4) thus causes the link 52b to draw the lever 48 rightward, withdrawing the roller 40 away from the roller 39. When the handle 52a is released the springs 50, 51 snap the respective levers 48 and 52 back. But the lost motion connection 48a prevents imposition of the tension of spring 51 on the lever 48 and hence in the clamping rollers.

A combination kinking and cut-off device designated generally as 55 (see Figs. 1 and 4) is also mounted on the base 24. This device includes a bar 56 slidable endwise within a housing 57 in response to swing of the lever 22 heretofore noted and to which it is pivotally connected. An upstanding lug 58 on the inner end of the bar 56 is disposed within the lowermost convolution of the hairspring 15 at a point slightly beyond the bite of the clamping rollers 39, 40. As the bar 56 is pulled endwise toward the housing 57, the adjacent portion of the hairspring 15 is thus pulled against a stationary abutment 59, kinking the same in the configuration indicated at 15a in Fig. 3a. At the same time a stationary cutter blade 60 shears off the unneeded end portion of the hairspring beyond the kink. It will be understood that when such a hairspring is installed in a clock or the like a wedge is normally applied at the kink 15a to anchor the hairspring at such point.

As previously noted the hairspring 15 serves, while in the testing machine, as one electrode of a condenser. A cooperating stationary electrode is constituted by a tapered metal shell 61 (Figs. 3 and 6) fitted over the insulating stud 33. This shell is shaped to conform generally to the helical configuration of the hairspring 15 that the latter assumes while in the testing machine. Upon reference to Fig. 3 it will be observed that the stud 33 has a laterally projecting flange 33a of insulating material integral therewith which is set into the face of the metal base 24 so as preclude any possibility of inadvertent grounding of the shell 61.

Circuit connections are established to the hairspring 15 and shell 61 which constitute the two condenser electrodes. For that purpose a wire 62 is led from the shell 61 to a contact prong 63 received in a receptacle 64. The hairspring 15, on the other hand, is grounded through the metal clamping roller 39 which it contacts and a wiping spring contact 65 which is connected to ground and engages a pin 66 carrying the roller 39. To further insure adequate grounding of the spring 15 a metal cup 67 (Figs. 4 and 6) is grounded to metal plate 24 and carries a globule of mercury 68 in which a portion of the hairspring is received.

With the hairspring 15 fixed in the testing machine in the position shown in Fig. 3, the operator gives the balance wheel 17 a flip to set it oscillating. Upon each contraction and expansion of the vibrating hairspring 15, such spring approaches toward and retreats from the metal shell 61, thus periodically varying the air gap between them and hence the capacity of what amounts to an electrical condenser constituted by the hairspring and shell and the air dielectric between them. Provision is made for utilizing such periodic changes in capacity to control correspondingly the flashing of a lamp which illuminates the stroboscopic disk 18. The disk is driven at a constant speed by a motor 70, the speed selected being one corresponding to the desired rate of hairspring vibration. The motor 70 may, for example, be a synchronous motor supplied from a "standard frequency generator" 71 (Fig. 9) so that by changing the generator frequency the motor speed can be correspondingly controlled. Various forms of such standard frequency generators are well-known in the art and consequently need not be detailed here. The stroboscopic disk 18 may take various specific forms. In this instance it is translucent and has an arbitrarily chosen series of numbers on it. Such numbers are applied so that the operator may more readily detect apparent movement of the disk. Of course the disk actually revolves at constant speed all of the time but with flashing or stroboscopic illumination of the same it appears to stand still when the flashes are synchronized with its speed of rotation, and to drift or turn when there is a departure from such synchronization.

Various forms of electronic circuits may be employed for utilizing the periodic changes in electric capacity occurring as an incident to vibration of the hairspring 15 for producing a suitable signal and in particular for flashing a light illuminating the stroboscopic disk 18. An electronic type of circuit is preferred since the changes in capacity available from the spring vibration are very minute in character, a suitable form of circuit being illustrated in Figs. 10 and 11 herein.

Referring first to the electronic pick-up arrangement shown in Fig. 10, the same is illustrated as including an oscillator tube, shown as a triode 72, having a cathode 73, control grid 74 and anode 75. Suitable tuned circuits are associated with the triode to cause it to operate as an oscillator. Thus the cathode 73 is connected to ground through a resistor 76 shunted by a condenser 77, while the grid 74 has a feed back connection from the plate or anode 75 through a variable condenser 78 in shunt with an inductive winding 79. The latter pair of elements are connected to the grid through a condenser 80 shunted by a resistor 81. Plate potential is supplied to the anode 75 from a voltage divider 82 through an inductance 83 and primary winding 84 of a coupling transformer 85, a condenser 86 being connected between the common terminals of the windings 83, 84 and ground. One type of oscillator circuit that has been successfully used is that known as an U. H. F. Superregenerator. It is illustrated in Fig. 4, page 372 of "The Radio Handbook," ninth edition 1942, published by Editors and Engineers, 1422 North Highland Ave., Los Angeles.

The variable condenser 78 is adjusted to tune the oscillator circuit to a point such that it is only slightly out of resonance. Consequently, introduction into the oscillator circuit of the small change in capacity effected by the condenser constituted by the hairspring 15 and shell 61 serves to pass the oscillator to and through its resonance point once during each contraction of the hairspring and again during each expansion of the hairspring. It is for that purpose that the shell 61 is connected to ground through a winding 87 inductively coupled with the winding 79, the input circuit being completed through the grounding of the hairspring 15.

With the pickup circuit of Fig. 10 adjusted as described above, the output of the tube 72 will diminish substantially to zero amplitude at the two resonance points which occur in each full cycle of vibration of the hairspring 15. A signal is thus produced on each contraction and each expansion of the hairspring 15 as it vibrates. The output of the oscillator tube 72 is suitably amplified and in course of such amplifications the signal is sharpened. In the present instance a first stage of amplification is shown in Fig. 10 and includes a triode 88 having its input coupled to the oscillator through the transformer 85 and its output coupled to the next stage of amplification through a condenser 89. Succeeding stages of amplification are shown in Fig. 11, the points of connection between the networks of Figs. 10 and 11 being indicated at Y—Y. Such succeeding stages of amplification include pentodes 90, 91 and a triode 92 coupled through condensers 93, 94 and arranged with a coupling condenser 95 on the output of the triode 92. The output of the tube 92 is used to control a multivibrator or relaxation oscillator shown as being of conventional form and including a duplex triode 96. As is customary in such oscillators, the output of one triode section is fed to the input of the other triode section. The output of the tube 92 is used to lock in step with itself the inherently unstable oscillations of the relaxation oscillator, the coupling condenser 95 being connected to the input of the first triode section of the tube 96 for that purpose.

The output of the relaxation oscillator is coupled through a condenser 97 to the input of a single stage power amplifier including a pentode 98. The power amplifier in turn feeds a strobotron 99, the latter being a gas-filled tube which ionizes upon each impulse received from the amplifier and thus applies a flash of light to the stroboscopic disk 18 upon each ionization. Power for the electronic circuits is supplied from a conventional power network including a full wave rectifier tube 100.

The operation of the disclosed apparatus will, in general, be clear from the foregoing. By way of brief recapitulation, let it be assumed that a hairspring and balance wheel assembly 15—17 has been mounted in the machine as shown in Fig. 3 with the outer end of the hairspring pulled down and clamped between the rollers 39, 40. Let it be further assumed that the stroboscopic disk is being driven at a constant speed corresponding to the rate of vibration which is desired for the hairspring. The operator gives the balance wheel 17 a partial turn and releases it, thus setting the hairspring 15 to vibrating.

As the hairspring 15 vibrates it periodically changes the capacity of the condenser of which it constitutes one electrode, thereby resulting in a flashing of the lamp 99 at a corresponding frequency. If the hairspring is not vibrating at precisely the preselected frequency, the disk 18 will appear to revolve slowly. Upon observing such apparent turning of the disk, the operator lengthens or shortens the hairspring by turning the knob 21. This results in a corresponding change in the natural frequency of vibration for the hairspring so that its rate of vibration is finally brought into synchronism with that of the disk 18. Such condition is manifested by an apparent stoppage of the disk.

Having achieved the desired adjustment of the hairspring, the operator pulls on the lever 22, kinking the hairspring and cutting off any excess length. Then he pulls out on the handle 52a, releasing the hairspring from the rollers 39, 40. Thereafter another hairspring assembly may be inserted and the process repeated.

I claim as my invention:

1. In an apparatus for testing the natural period of vibration of an electrically conductive spiral hairspring having its inner end anchored to a balance wheel staff, the combination of means for freely journaling the staff for oscillation about its longitudinal axis, means for releasably clamping the outer end portion of the spring with the latter pulled axially of the staff into the configuration of a generally axially tapered helix, an electrode contoured externally in general conformity with said configuration of the spring, means supporting said electrode in electrically insulated spaced relation to the spring within the confines of the same so that as the spring vibrates about the axis of the staff the spring convolutions contract and expand with reference to said electrode while remaining out of contact with the latter, and means for producing a signal in response to changes in electrical capacitance between the spring and electrode incident to the periodic changes in spacing between the same caused by vibration of the spring.

2. In an apparatus for testing the natural period of vibration of an electrically conductive vibratory spiral spring, the combination with means for establishing an electric circuit in which the spring constitutes one electrode of a condenser said spring having at least one turn surrounding a second electrode of said condenser whose capacity varies as an incident to changes in spring configuration during vibration, of means for comparing continuously with a standard frequency the periodicity of capacity changes occurring in said condenser.

3. In an apparatus for testing the natural period of vibration of an electrically conductive spiral spring, the combination of an electrode, means for supporting the spring for vibration so that at least one full turn of said spring is in closely spaced and electrically insulated relation to said electrode, and means for producing a signal in response to changes in electrical capacitance between the spring and electrode incident to the periodic change in spacing between the same caused by vibration of the spring.

4. In an apparatus for testing the natural period of vibration of an electrically conductive spiral spring, the combination of an electrode, means for supporting the spring for vibration so that at least one full turn of said spring is in closely spaced and electrically insulated relation to said electrode, means for producing a signal in response to changes in electrical capacitance between the spring and electrode incident to the periodic vibration of the spring with reference to the electrode, and means for comparing the periodicity of said signal with a standard frequency.

5. In an apparatus for testing the natural period of vibration of an electrically conductive spiral spring, the combination of an electrode, means for supporting the spring for vibration so that at least one full turn of said spring is in closely spaced and electrically insulated relation to said electrode, a stroboscopic disk having means for revolving the same at a predetermined fixed speed, and means for producing flashes of light illuminating said disk in response to the periodic changes in electrical capacitance between said spring and electrode incident to the vibration of said spring.

6. In an apparatus for testing the natural period of vibration of an electrically conductive spring, the combination of an electrode, means for supporting the spring for vibration in closely spaced and electrically insulated relation to said electrode, a tuned oscillator circuit, means for introducing into said tuned oscillator circuit the periodically varying electrical capacity between said spring and electrode produced as an incident to vibratory movement of said spring relative to said electrode, said oscillator circuit including adjustable tuning means for tuning the same to a point sufficiently close to resonance that the changes in said capacity incident to vibration of the spring will pass the circuit to and through resonance upon each vibration of the spring, and means for producing a visible signal in response to the periodic establishment of resonance conditions in said oscillator circuit.

7. In an apparatus for testing the natural period of vibration of an electrically conductive spring, the combination of an electrode, means for supporting the spring for vibration in closely spaced and electrically insulated relation to said electrode, a tuned oscillator circuit, means for introducing into said tuned oscillator circuit the periodically varying electrical capacity between said spring and electrode produced as an incident to vibratory movement of said spring relative to said electrode, said oscillator circuit including adjustable tuning means for tuning the same to a point sufficiently close to resonance that the changes in said capacity incident to vibration of the spring will pass the circuit to and through resonance upon each vibration of the spring, a stroboscopic disk having means for revolving the same at a predetermined fixed speed, and means for producing flashes of light illuminating said disk in response to the periodic establishment of resonance conditions in said oscillator circuit.

8. In an apparatus for testing the natural period of vibration of a balance wheel and hairspring assembly for timepieces including a staff having a balance wheel and spiral hairspring secured thereto, the combination of means including a pair of spaced bearings adapted to receive the ends of the staff for supporting the assembly for free oscillation, a metal shell tapered axially toward one of said bearings and located on the side of the latter remote from the other bearing, a pair of clamping rollers disposed laterally of said shell in position to pull the hairspring into tapered helical configuration about said shell in spaced relation to the latter, means for turning said rollers to vary the length of the hairspring and consequently its natural period of vibration, means for electrically insulating said shell and hairspring from each other in order that they may serve as the respective electrodes of a condenser, and means for producing a signal in response to changes in the capacity of such condenser incident to the periodic changes in spacing between the spring and shell caused by vibration of the spring.

9. In an apparatus for testing the natural period of vibration of a balance wheel and hairspring assembly for timepieces including a staff having a balance wheel and spiral hairspring secured thereto, a base, an electrode projecting upwardly from said base and electrically insulated therefrom, a bearing supported above said base and electrically insulated therefrom, means including a second bearing supported above said base in alignment with the first-mentioned bearing for supporting the staff for free oscillation, a pair of clamping rollers disposed laterally of said electrode in position to pull the hairspring into tapered helical configuration about said electrode in spaced relation to the latter, means for turning said rollers to vary the length of the hairspring and consequently its natural period of vibration, means including a plug type terminal carried by said base for establishing an electric circuit connection from said electrode, and means for producing a signal in response to changes in electrical capacitance between the spring and electrode incident to the periodic change in spacing between the same caused by vibration of the spring.

10. In an apparatus for testing the natural period of vibration of a balance wheel and hairspring assembly for timepieces including a staff having a balance wheel and spiral hairspring secured thereto, a base, an electrode projecting upwardly from said base and electrically insulated therefrom, a bearing supported above said base and electrically insulated therefrom, means including a second bearing supported above said base in alignment with the first-mentioned bearing for supporting the staff for free oscillation, a pair of clamping rollers disposed laterally of said electrode in position to pull the hairspring into tapered helical configuration about said electrode in spaced relation to the latter, means for turning said rollers to vary the length of the hairspring and consequently its natural period of vibration, means including a cup carried by said base and containing a globule of mercury in which the free end portion of the spring beyond said rollers may be immersed for establishing an electric circuit connection to the spring, and means for producing a signal in response to changes in electrical capacitance between the spring and electrode incident to the periodic change in spacing between the same caused by vibration of the spring.

11. In an apparatus for testing the natural period of vibration of a balance wheel and hairspring assembly for timepieces including a staff having a balance wheel and spiral hairspring secured thereto, the combination of a base carrying a first bearing, an overarm on said base, a sleeve having a rod disposed therein for limited axial movement, said rod having a second bearing on its lower end, means frictionally supporting said sleeve on said overarm for axially slidable movement in alignment with said first bearing, means for shifting said rod downwardly to cause a staff to be engaged between said bearings, said downward shifting of the rod causing a corresponding downward movement of said sleeve, means for shifting said rod to the upper extremity of its range of movement within said sleeve to thereby insure free oscillatory movement of the staff in said bearings, and means for releasably anchoring the outer end of said spiral hairspring.

12. In an apparatus of the type described, the combination of means for supporting for free oscillation an assembly comprising a staff carrying a balance wheel and spiral hairspring, a pair of revoluble clamping rollers positioned to receive therebetween the free end portion of the hairspring, a pivoted lever supporting one of said rollers for bodily movement toward and from the other, a spring yieldably biasing said lever to swing the roller thereon toward the other roller to clamp the spring with a pressure determined by the stress of said spring, meshing gears rigid with respective ones of said rollers, a slide having a third gear journaled thereon meshing with the one of the first-mentioned gears which is rigid with the bodily movable roller, manually operable means for rotating said third gear to revolve said rollers and thereby adjust the free length of the hairspring, means yieldably urging said slide toward said rollers, a positive stop for limiting the movement of said slide toward said rollers, and a lost motion connection between said slide and said lever, whereby withdrawal of said slide serves to pull said lever and the roller borne thereby away from the other roller but upon movement of said slide in the opposite direction permits said stop to prevent the imposition of the bias of said yieldable means on said lever.

ROBERT OLINGER.

REFERENCES CITED

The following references are of record in the file of this patent:

UNITED STATES PATENTS

| Number | Name | Date |
|---|---|---|
| 964,743 | Bindschedler | July 19, 1910 |
| 1,779,122 | Franz | Oct. 21, 1930 |
| 2,058,616 | Norrman | Oct. 27, 1936 |
| 2,077,008 | Poole | Apr. 13, 1937 |
| 2,086,391 | Poole | July 6, 1937 |
| 2,158,725 | Lawson et al. | May 16, 1939 |
| 2,343,452 | Gibbs | Mar. 7, 1944 |
| 2,354,945 | Cohen et al. | Aug. 1, 1944 |
| 2,354,964 | Ostermann et al. | Aug. 1, 1944 |